Dec. 26, 1933.    H. H. McGREGOR ET AL    1,941,099
MATERIAL HANDLING AND CUTTING APPARATUS
Filed April 3, 1931    5 Sheets-Sheet 1

INVENTOR
Henry H. McGregor
& Knut E. Eck
BY
Ely & Barrow
ATTORNEYS

Dec. 26, 1933.  H. H. McGREGOR ET AL  1,941,099
MATERIAL HANDLING AND CUTTING APPARATUS
Filed April 3, 1931  5 Sheets-Sheet 3

INVENTOR
Henry H. McGregor
& Knut E. Eck
BY
ATTORNEYS

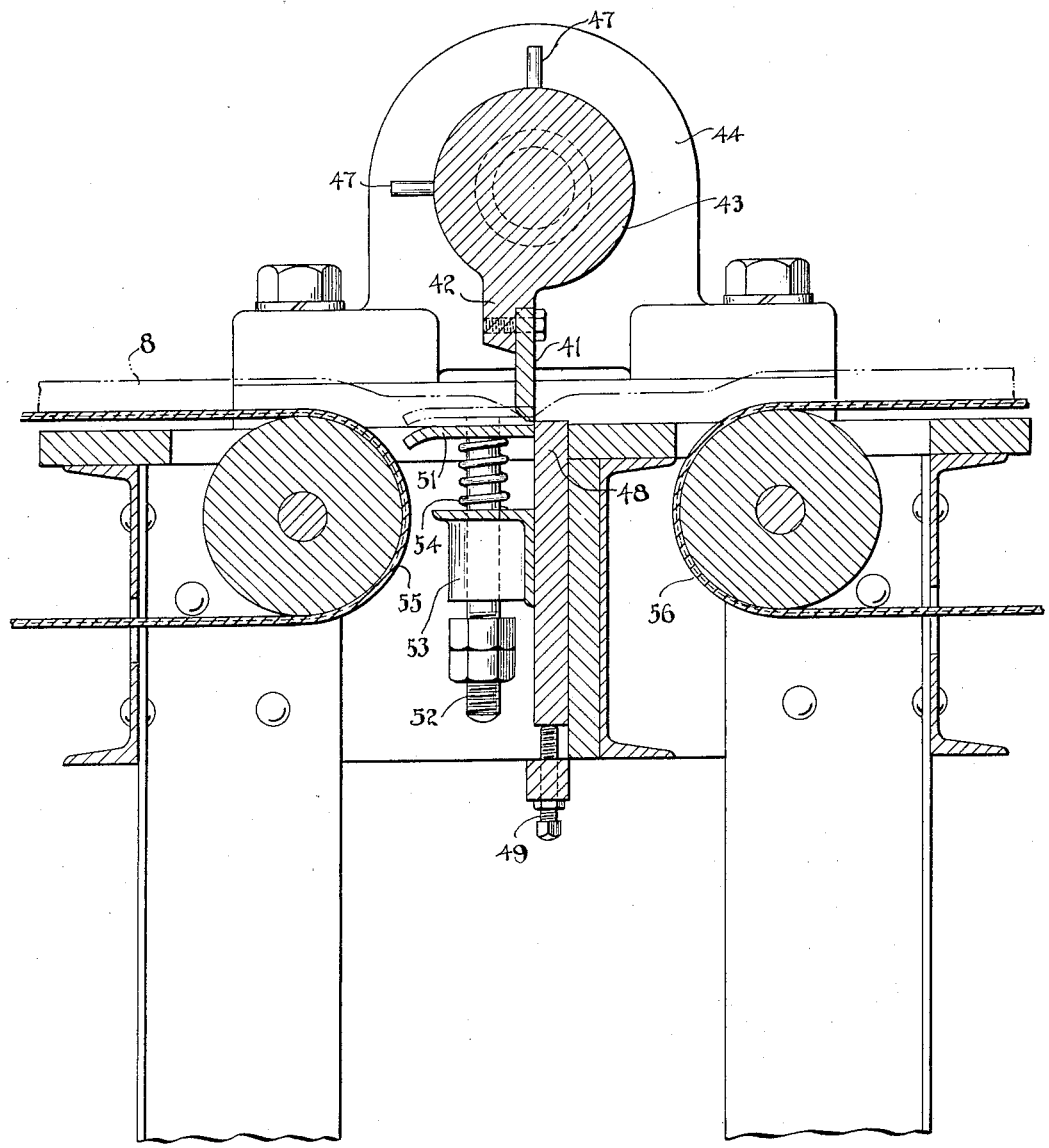

Patented Dec. 26, 1933

1,941,099

UNITED STATES PATENT OFFICE 1,941,099

MATERIAL HANDLING AND CUTTING APPARATUS

Henry H. McGregor and Knut E. Eck, Akron, Ohio, assignors to The Firestone Tire & Rubber Company, Akron, Ohio, a corporation of Ohio Application April 3, 1931. Serial No. 527,380

2 Claims. (Cl. 164—68)

This invention relates to apparatus for handling rubber or like batches after masticating or similar operations.

The general object of the invention is to provide simple, fool-proof, efficient apparatus for use with a rubber plasticator or a similar device, which will serve to convey the rubber or other material from the plasticator, cool it, dip it into a soapstone or like solution and finally cut it into appropriate lengths for handling purposes.

The foregoing and other objects of the invention are achieved by the apparatus illustrated in the accompanying drawings and described below, it being understood that the invention is not limited to the specific details shown and described.

In the drawings:

Figures 1ª and 1ᵇ constitute together a side elevation of the apparatus embodying the invention. The line of division between the two two portions of the machine is indicated by the line A—B.

Figures 2ª and 2ᵇ constitute together a plan view of the apparatus. The line of division between the two parts of the machine is also indicated by the line A—B.

Figure 5 is a sectional view on line 5—5 of Figure 2ᵇ.

Figure 1:
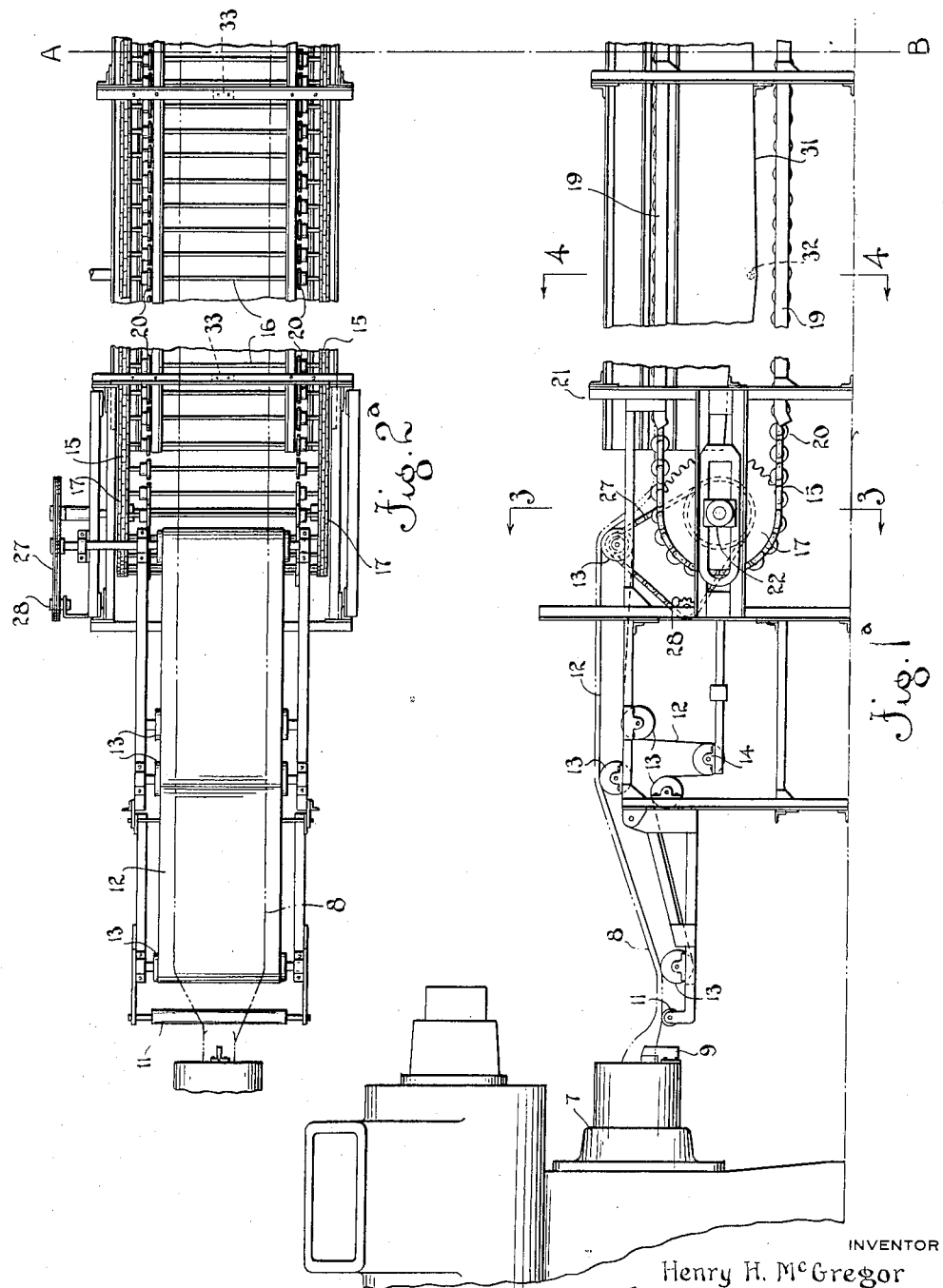

Referring to the drawings the numeral 7 indicates a plasticator, an extruding machine or other similar device which is adapted to mix or otherwise treat rubber or the like and which extrudes it in a continuous tube or sheet shown at 8. In case the material is extruded in tube form a knife 9 is secured to the extruder head which serves to slit the bottom of the tube and thus allows the tube to assume a flat form as shown.

In alignment with a plasticator 7 are suitable conveying means which may include a journaled roller 11 and a rubber conveyor belt 12 carried on rollers 13. A take-up roller may be provided as indicated at 14. After leaving the conveyor belt 12 the material passes to a main conveyor which comprises a pair of endless roller chains 15 connected by a plurality of cross rods or bars 16 carrying spacing disks 20. The chains 15 extend around sprocket wheels 17 at one end and about sprocket wheels 18 at the other end and throughout their lengths are supported by tracks 19 which may be formed of angle iron secured to a suitable framework 21 as indicated in the drawings. The sprockets 17 may be journaled in adjustable bearings 22 to allow any slack in the chains to be taken up.

A platform 23 is preferably provided over the end of the main conveyor which platform carries a motor 24 which drives the conveyor through a reduction gear unit 25 and a speed change device 26. The conveyor 12 may be driven from the main conveyors by providing suitable sprockets and chain as indicated at 27. One of the sprockets 28 is an idler sprocket which is slidably carried in the frame 21 and which serves to take up the slack in the chain of the drive mechanism 27 when the sliding bearings 22 are adjusted.

Figure 4:
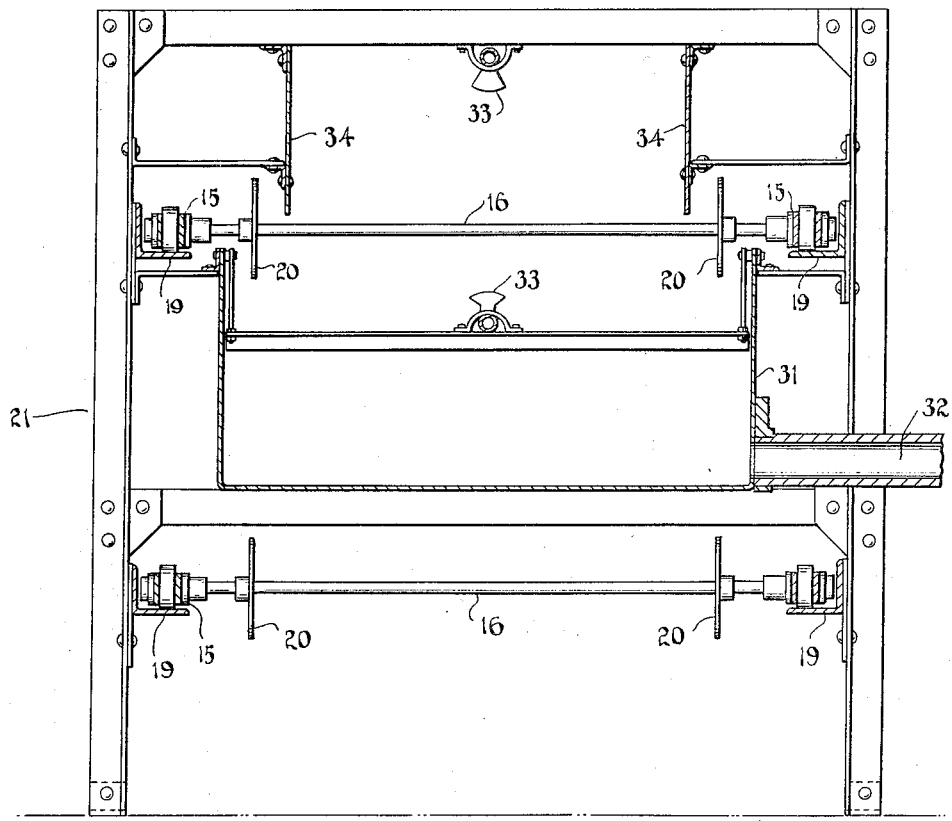
Figure 4 is a vertical sectional view taken on line 4—4 of Figure 1ª.

Mounted in the frame 21 under the upper stretch of the conveyor but over the lower stretch is a long tank 31, the bottom of which may be sloped to the middle and provided with a drain pipe 32 as shown in Figures 1ª and 4. In order to cool the extruded material 8 a plurality of fluid spray means 33 are mounted on the frame 21 above and below the upper stretch of the conveyor. As indicated in Figure 4 side plates 34 are provided to keep the spray fluid in the proper place.

From the main conveyor the material 8 passes through a tank 35 containing soapstone water or a like mixture. A roller 36 is mounted on the front of the tank and a large submerging roller 37 is journaled midway of the tank. The axles of rolls 36 and 37 are provided with sprockets so that the rolls are driven by a chain 38 from the main conveyor. As shown in Figure 1ᵇ the material 8 passes over roller 36 and under roller 37 so that the material is thus coated with the soapstone solution or other non-sticking solution contained in the tank 35.

After coating the material 8 is cut into lengths for handling purposes by a knife 41, fixed to a rib 42 of a hub 43 which hub is journaled in pillows 44 and which is driven by a motor 45 through suitable reduction gearing 46. Pins 47 may be fixed in the hub 43 to assist in positioning and moving the material 8 along between cuts. The knife 41 is of the so-called lawn mower type and cooperates with an anvil 48 which is made adjustable by the provision of screws 49. In front of the anvil 48 a resiliently positioned guide plate 51 is provided and means for resiliently positioning it may include bolts 52 secured thereto and guided in a support 53 secured to the anvil 48. Compression springs 54 are provided on the bolts 52 between the support 53 and plate 51 as will be understood.

The material 8 is fed to and from the cutter by conveyors which may comprise rubber belts 55 and 56 carried on suitably journaled rollers. The conveyors 55 and 56 are driven from the main conveyor by the chain 38 which extends around a sprocket on the axle of one of the rollers. The axles of the rollers adjacent the cutter are extended and provided with aligned sprockets which are connected by an endless chain 57 so that when the conveyor 55 is driven the conveyor 56 will also be driven.

In the operation of the embodiment of the invention illustrated the motor 24 is started which drives all of the conveyors in the apparatus at the same surface speed. The material 8 is now extruded from the plasticator 7 in tube form and the knife 9 slits the bottom allowing the tube to be spread out flat. The speeds with which the material 8 is extruded and the surface speeds of the conveyors are equalized by adjusting the speed change device 26. The material 8 is passed over the conveyor 12 to the main conveyor, where the material, which is hot from the treating and extruding operation, is cooled by the sprays 33, generally of water. The spraying means if liquid drop into the tank 31 and may be drained by the pipe 32. The open construction of the main conveyor and the position of the sprays allows the material to be cooled from both sides.

The roller construction of the chains 15 greatly reduce friction and the power required to move the main conveyor. The slackness of the chains 15 may be controlled by adjusting the bearings 22. If the position of the bearings 22 is changed the idler sprocket 28 will serve to maintain the drive 27 to the conveyor 12. Any slackness in the belt conveyor 12 is taken up by the take-up roller 14.

Figure 2:
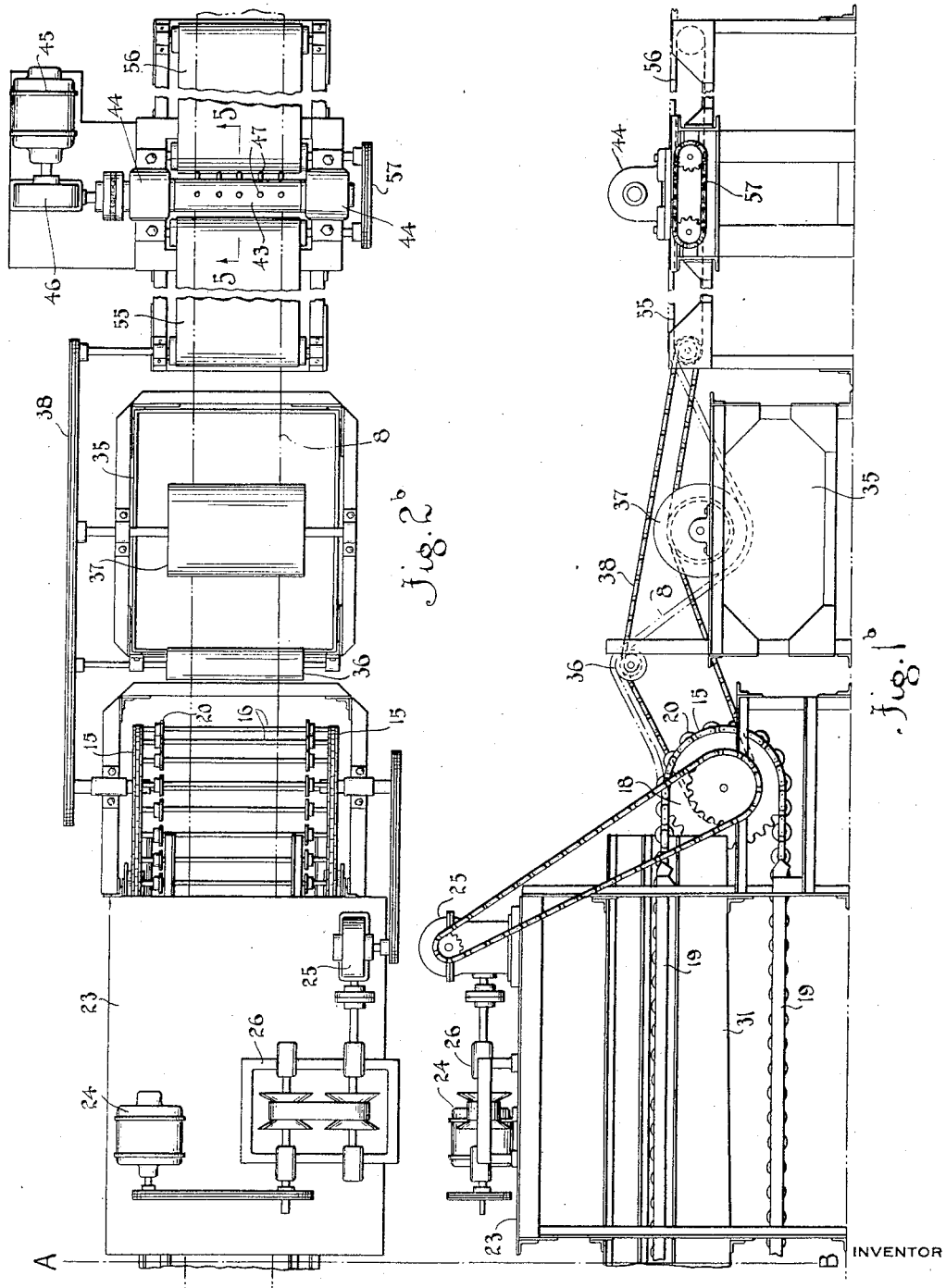
Figure 3:
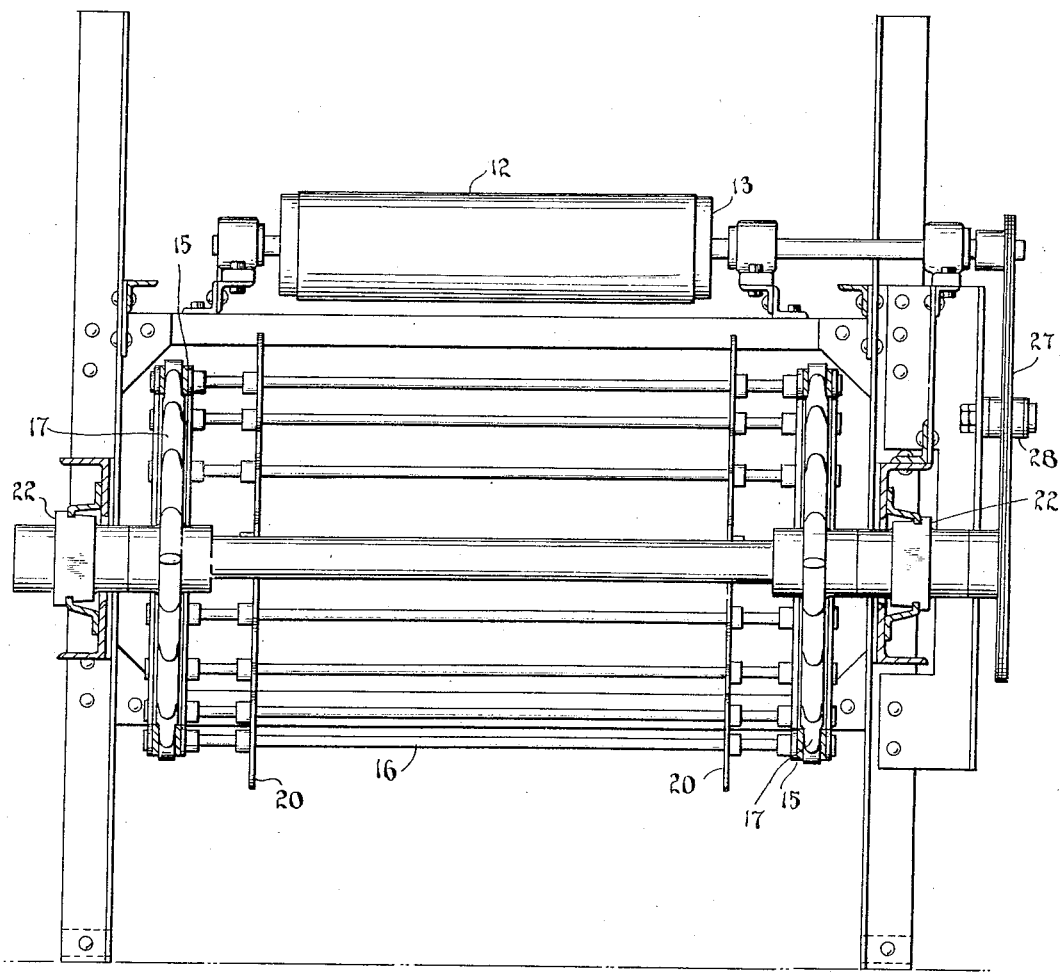
Figure 3 is a vertical sectional view taken on line 3—3 of Figure 1ª.

From the main conveyor the material 8 passes through the tank of soapstone water as shown in Figures 1b and 2b which coats the rubber so that it will not stick together or to other surfaces.

The material is now brought by the conveyor 55 to the cutter where it is cut into the desired lengths. The length of the pieces cut can be adjusted by varying the speed of the motor 45 or by other means. In the cutting operation the guide plate 51 may move down somewhat as the knife 41 approaches the anvil 48 as shown in full lines in Figure 5, but as soon as the cut has been made the springs 54 force the plate up to the outward limit of its movement as shown in dotted lines, so that the end of the material will slide over the anvil 48. If the material should tend to curl up after cutting, the pins 47 serve to bring the material back under the hub 43.

The body of the material 8 will cause it to travel from the conveyor 55 to the conveyor 56 after the cutting operation. The material, after leaving the cutter is removed from the conveyor 56 and stacked or otherwise treated or handled.

While the invention is particularly adapted for use with rubber and rubber treating machine it will be apparent that the principles thereof are applicable to the treatment and handling of a plurality of other materials.

As many changes could be made in the construction it is intended that all matter shown in the accompanying drawings or described herein shall be interpreted as illustrative only and not in a limiting sense. Accordingly various modifications and applications of the invention can be resorted to without departing from the spirit of the invention or the scope of the appended claims.

What is claimed is:

1. A machine for cutting plastic material into the desired lengths comprising a journaled hub, a knife secured to said hub, an anvil cooperating with said knife, means adjustably supporting said anvil, a guide plate resiliently positioned adjacent the upper edge of said anvil, means on said hub for maintaining the material between the hub and the anvil, and means for rotating said hub.

2. In combination with a conveyor line for continuously transporting a strip of plastic material, a cutter interposed in said conveyor line for cuttting said plastic material into desired lengths, said cutter including a fixed blade and a movable blade, and a guide member for guiding the plastic material over said fixed blade between cutting operations, said guide being momentarily retractible during the cutting operation to permit the plastic material in advance of said fixed blade to drop below the cutting edge of said blade, the guide upon its return again carrying the plastic material beyond the fixed blade whereby the cutting operation may be performed while the plastic material is in continuous motion on the conveyor.

HENRY H. McGREGOR.
KNUT E. ECK.